US008667577B2

(12) United States Patent
Challener et al.

(10) Patent No.: US 8,667,577 B2
(45) Date of Patent: Mar. 4, 2014

(54) REMOTE REGISTRATION OF BIOMETRIC DATA INTO A COMPUTER

(75) Inventors: David C. Challener, Raleigh, NC (US);
Howard J. Locker, Cary, NC (US);
Mark C. Davis, Durham, NC (US);
Daryl C. Cromer, Cary, NC (US);
Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 633 days.

(21) Appl. No.: 12/242,340

(22) Filed: Sep. 30, 2008

(65) Prior Publication Data

US 2010/0083357 A1   Apr. 1, 2010

(51) Int. Cl.
*G06F 21/00* (2013.01)
(52) U.S. Cl.
USPC ................................. 726/19; 713/186; 713/2
(58) Field of Classification Search
None
See application file for complete search history.

(56) References Cited

U.S. PATENT DOCUMENTS

| | | | | |
|---|---|---|---|---|
| 5,933,498 A * | 8/1999 | Schneck et al. | ................ | 705/54 |
| 6,167,517 A * | 12/2000 | Gilchrist et al. | .............. | 713/186 |
| 6,256,737 B1 * | 7/2001 | Bianco et al. | ................ | 713/186 |
| 7,174,463 B2 * | 2/2007 | Cromer et al. | ................ | 713/186 |
| 7,222,360 B1 * | 5/2007 | Miller | ................ | 726/3 |
| 7,231,070 B2 * | 6/2007 | Bjorn et al. | .................... | 382/124 |
| 7,240,197 B1 * | 7/2007 | Yamagami et al. | ........... | 713/168 |
| 7,337,310 B2 * | 2/2008 | Cheston et al. | .................. | 713/1 |
| 7,484,246 B2 * | 1/2009 | Matsuyama et al. | ............ | 726/27 |
| 7,669,047 B2 * | 2/2010 | Chou et al. | ........................ | 713/2 |
| 7,725,701 B2 * | 5/2010 | Rios et al. | ........................ | 713/1 |
| 7,917,741 B2 * | 3/2011 | Dutton et al. | ..................... | 713/1 |
| 2002/0069361 A1 * | 6/2002 | Watanabe et al. | ............ | 713/185 |
| 2002/0087877 A1 * | 7/2002 | Grawrock | ..................... | 713/200 |
| 2003/0070079 A1 * | 4/2003 | Cromer et al. | ................ | 713/186 |
| 2006/0064577 A1 * | 3/2006 | Chiu et al. | ........................ | 713/2 |
| 2006/0102717 A1 * | 5/2006 | Wood et al. | .................... | 235/382 |
| 2006/0123240 A1 * | 6/2006 | Chaiken | ....................... | 713/186 |
| 2006/0294359 A1 * | 12/2006 | Chou et al. | ........................ | 713/2 |
| 2007/0168667 A1 * | 7/2007 | Naccache | ..................... | 713/176 |
| 2007/0237366 A1 * | 10/2007 | Maletsky | ..................... | 382/115 |
| 2007/0250718 A1 * | 10/2007 | Lee et al. | ....................... | 713/186 |
| 2007/0282757 A1 * | 12/2007 | Pandya et al. | ................... | 705/76 |
| 2008/0209226 A1 * | 8/2008 | Venkatesan et al. | .......... | 713/186 |
| 2008/0209227 A1 * | 8/2008 | Venkatesan et al. | .......... | 713/186 |
| 2009/0006859 A1 * | 1/2009 | Zimmer et al. | ............... | 713/186 |
| 2009/0327678 A1 * | 12/2009 | Dutton et al. | ..................... | 713/2 |
| 2011/0126024 A1 * | 5/2011 | Beatson et al. | ............... | 713/186 |

* cited by examiner

*Primary Examiner* — Cordelia Zecher
*Assistant Examiner* — Michael R Vaughan
(74) *Attorney, Agent, or Firm* — Ference & Associates LLC

(57) ABSTRACT

Systems and arrangements for permitting the transmission of fingerprint authentication data to a system remotely, while also permitting the system to employ such data as well as passwords in order to operate a computer system, while ensuring a reliable level of security for any group or organization using such systems and arrangements.

20 Claims, 3 Drawing Sheets

REMOTE REGISTRATION OF BIOMETRIC DATA INTO A COMPUTER

FIELD OF THE INVENTION

The present invention relates generally to computer systems and to methods and arrangements for registering user fingerprints for security purposes.

BACKGROUND OF THE INVENTION

In various settings such as information technology (IT) group settings, fingerprint readers and other biometric input devices have gained great favor in enhancing system and network security, owing not in the least to the cost savings compared to the periodic resetting of passwords. However, this can become cumbersome in that a fingerprint template corresponding to the user needs to be installed at every system that the user might wish to use, such that he/she will have to offer up his/her fingerprint or other raw biometric input every time he/she wishes to newly use a different system.

Accordingly, a group of users (e.g., a group of IT employees and managers) may wish to keep track of fingerprint templates for themselves, and to distribute them to one or more user's desktop (or laptop) computers in such a way that will permit a user to logon without offering up his/her finger to a reader with every newly used system. In other words, such a group may wish to prepopulate computers with any and all individualization elements needed for a new owner before the owner receives a system. However, conventional arrangements limit the usefulness of such an arrangement to post-boot or post-logon user authentication.

SUMMARY OF THE INVENTION

Broadly contemplated herein, in accordance with at least one presently preferred embodiment of the present invention, are systems and arrangements for permitting the transmission of fingerprint authentication data to a system remotely, while also permitting the system to employ such data as well as passwords in order to operate a computer system, while ensuring a reliable level of security for any group or organization using such systems and arrangements.

In summary, one aspect of the invention provides a method comprising: receiving a biometric template at a system, the system comprising a physical computing device; at system logon, authenticating biometric user input in association with the biometric template; thereupon continuing system logon via employing an unlocking element distinct from the biometric user input.

Another aspect of the invention provides an apparatus comprising: a physical computing device; a main memory associated with the physical computing device; a manager, in communication with the main memory, which receives a biometric template; an authenticator which authenticates, at system logon, biometric user input in association with the biometric template; and an unlocker which continues system logon via employing an unlocking element distinct from the biometric user input.

A further aspect of the invention provides a program storage device readable by machine, tangibly embodying a program of instructions executable by the machine to perform a method comprising: receiving a biometric template at a system, the system comprising a physical computing device; at system logon, authenticating biometric user input in association with the biometric template; thereupon continuing system logon via employing an unlocking element distinct from the biometric user input.

Yet another aspect of the invention provides a method comprising: transmitting a biometric template to a system, the system comprising a physical computing device; at system logon, authenticating biometric user input in association with the biometric template; thereupon continuing system logon via employing an unlocking element distinct from the biometric user input.

Furthermore, an additional aspect of the invention provides a program storage device readable by machine, tangibly embodying a program of instructions executable by the machine to perform a method comprising: transmitting a biometric template to a system, the system comprising a physical computing device; at system logon, authenticating biometric user input in association with the biometric template; thereupon continuing system logon via employing an unlocking element distinct from the biometric user input.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
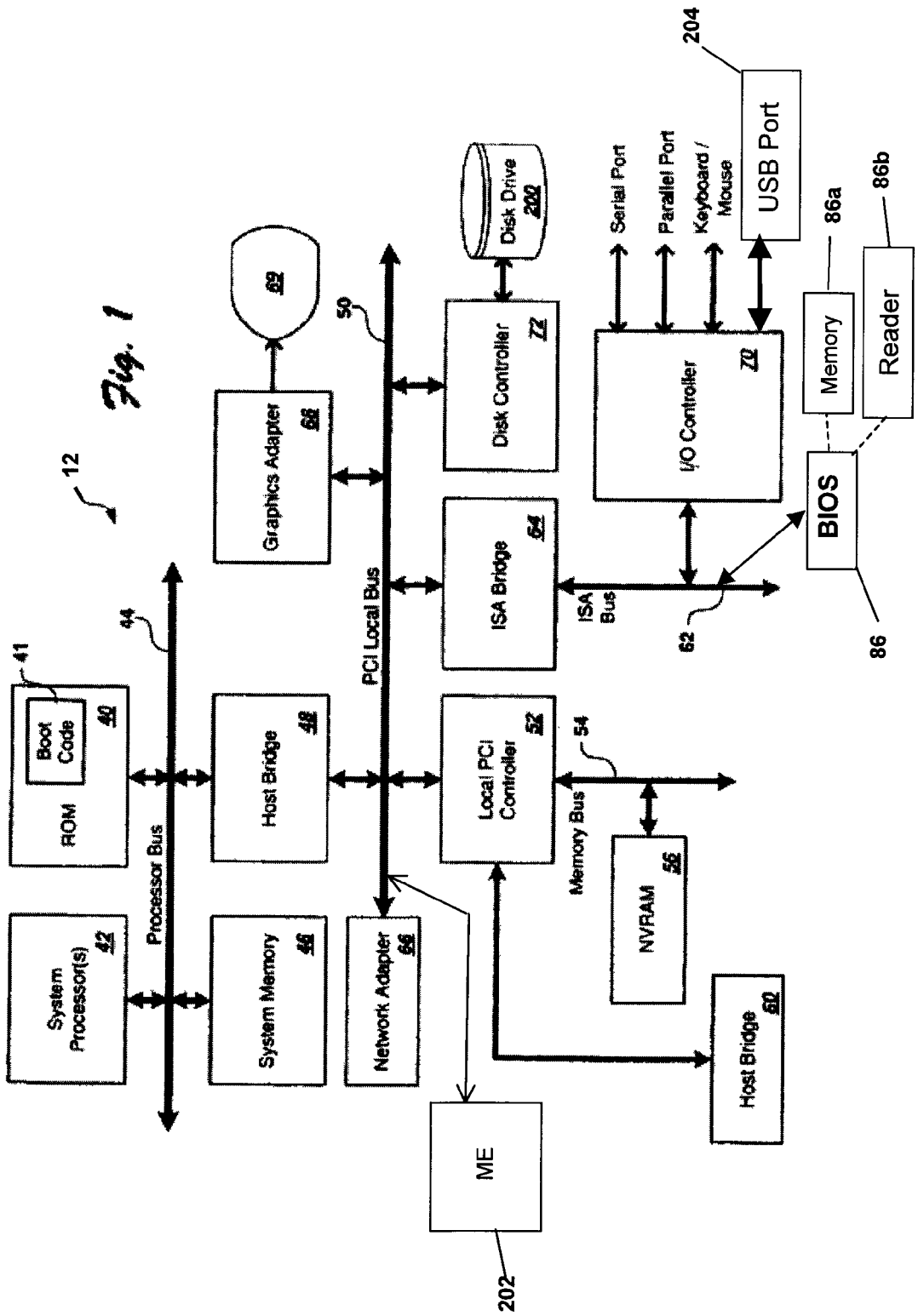
FIG. 1 schematically illustrates a computer system with added components.
Figure 2:
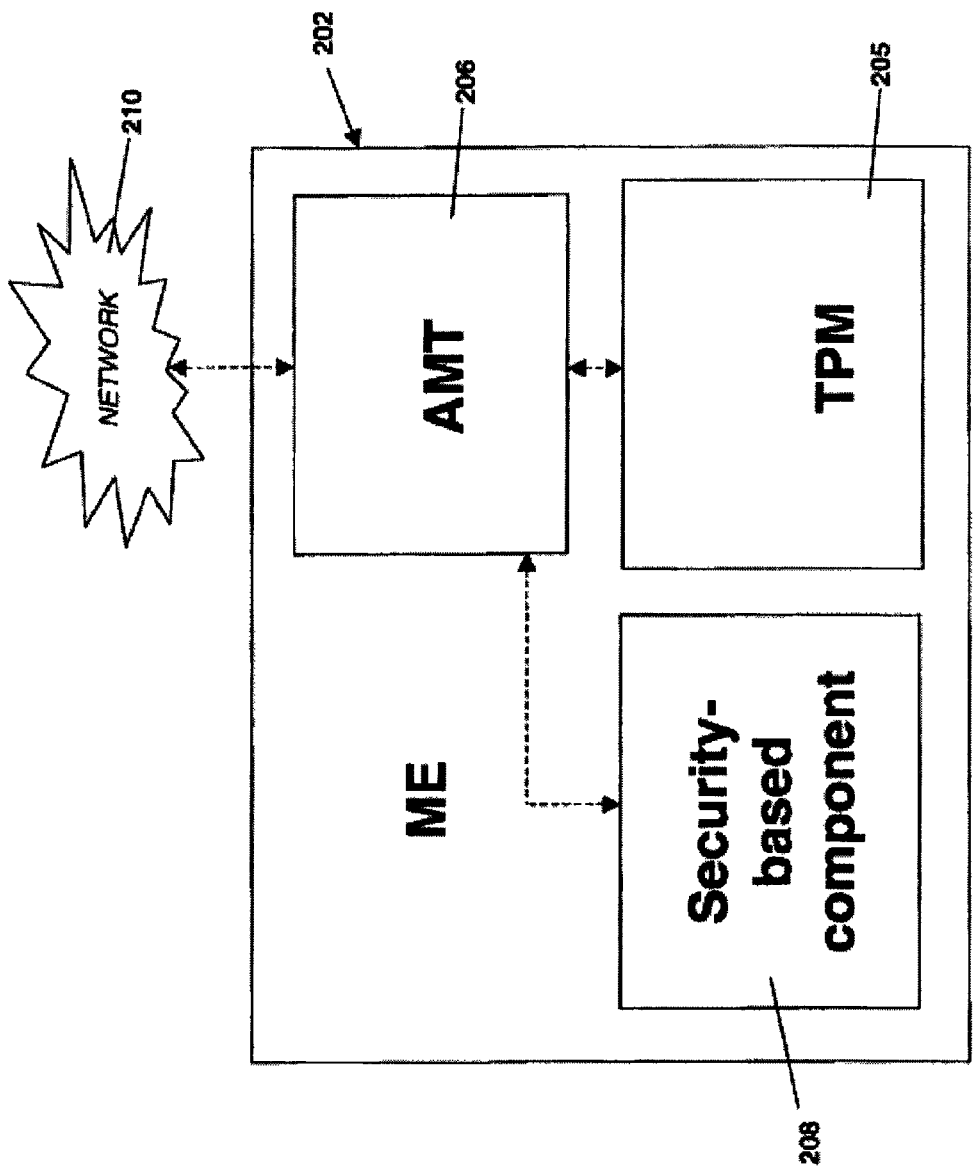
FIG. 2 schematically illustrates a management engine and components.
Figure 3:
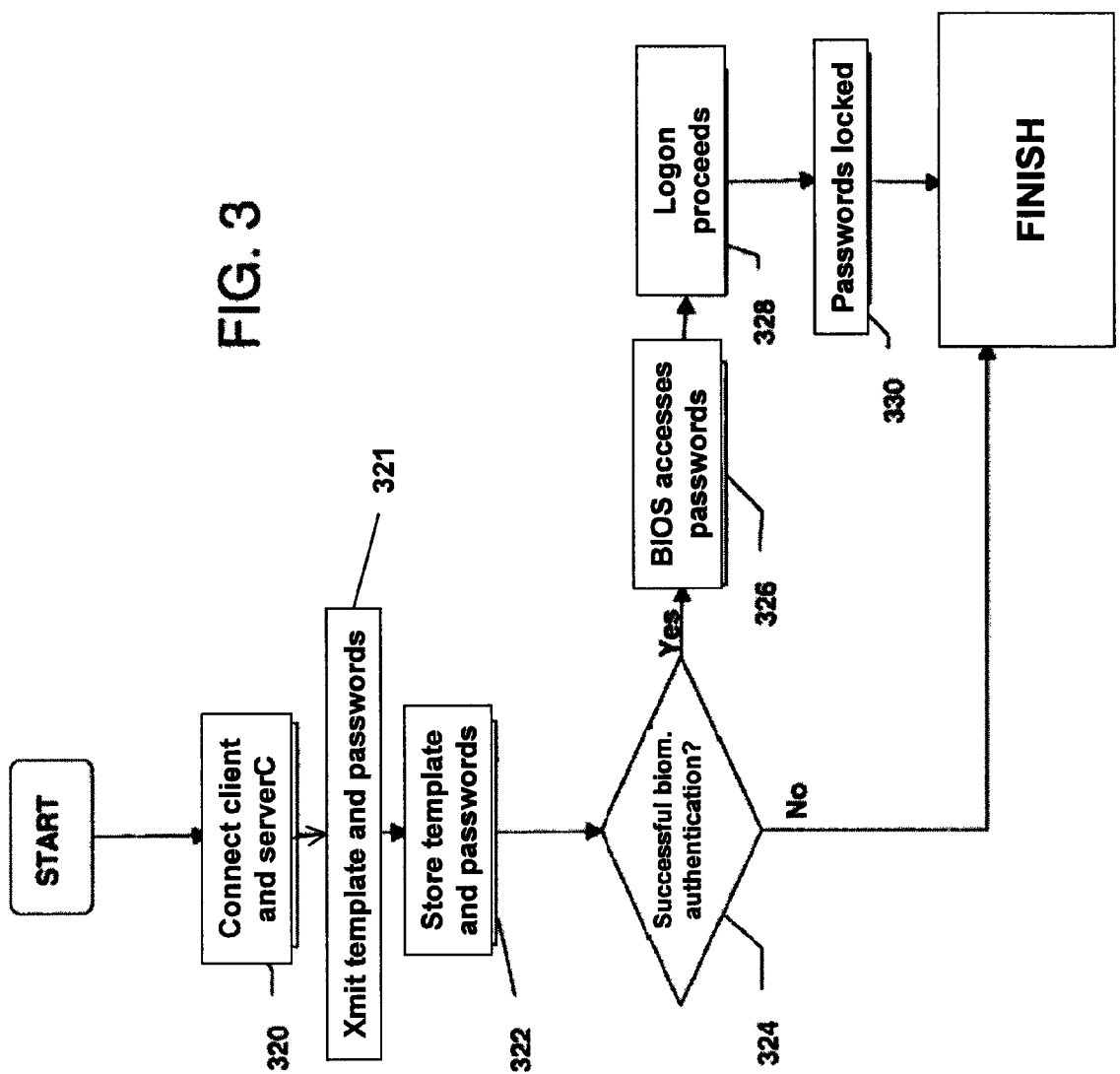
FIG. 3 schematically illustrates a process of facilitating fingerprint authentication remotely.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Generally, embodiments of the present invention are broadly contemplated in connection with use in a group arrangement, such as an arrangement comprising a server and clients. Such an arrangement, for instance, may be found within an IT organization. It will be appreciated from the discussion herethroughout that embodiments of the present invention present unique advantages in the context of a server-client setting, where security measures arranged at the server and client side alike result in efficient and much less cumbersome system access than in the case of conventional arrangements.

Referring now to FIG. 1, there is depicted a block diagram of an illustrative embodiment of a computer system 12. Such a computer system 12 can represent a "client" as understood herein in the context of a client-server setting. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 202 is a ME (management engine) which may be employed in accordance with at least one presently preferred embodiment of the present invention. ME's, as currently evolving (examples of which are being manufactured by Intel), are inclusive of several useful components that previously were operationally segregated. By integrating such components operationally, they can be more readily and flexibly managed to address contingent problems such as shutting down at least portions of a computer when the computer is in the hands of an unauthorized user. With regard to the system 12 shown in FIG. 1, the ME may be located on the PCI bus 50 as shown. It should be understood that the system 12 of FIG. 1 provides but one illustrative and non-restrictive example among a very wide variety of systems that can employ an ME in accordance with embodiments of the present invention.

Indicated at 86 is a BIOS (basic input/output system) whose functioning, in accordance with at least one presently preferred embodiment of the present invention, will be better understood from further discussion herebelow. As is known conventionally, associated with BIOS 86 is a flash memory 86a.

As shown schematically in FIG. 2, ME 202 may preferably include a Trusted Platform Module (TPM) 205, Active Management Technology (AMT) 206 (which preferably is embodied by Intel AMT, or IAMT) and one or more security-based components 208. A security-based component 208, by way of an illustrative example for the purposes of the present discussion, could be embodied by a fingerprint reader. It will be noted, for the purposes of ongoing discussion herein, that those AMT's (and related software) and TPM's as manufactured by Intel are often referred to as "IAMT" and "iTPM" Background information regarding IAMT may be found at www.intel.com/software.amt2, while background information regarding TPM's may be found at the Trusted Computing Group website, www.trustedcomputinggroup.org.

Generally, an AMT such as iAMT will contain a Management Engine (ME) which is a service processor, dedicated firmware for the service processor, and logic in an Ethernet and/or 802.11 and/or WAN controller to allow the ME to communicate with other locations across the internet even when the system is off, as these parts will always have power (i.e., very little power is required). Accordingly, one may send items to the ME 202, and it can process and return items irrespective of whether the main operating system (OS) is running or not running. Thus, ME 202 enables contact with a network (210) even when the system is technically off. The network interface can be realized directly or indirectly via essentially any suitable arrangement, e.g., a network adapter such as that indicated at 66 in FIG. 1. The network (210), for its part, can represent for the present discussion a connection or link to a server.

Fingerprint readers are generally well known to those of ordinary skill in the art. Though a very wide variety of fingerprint readers could be used in accordance with embodiments of the present invention, an illustrative example could involve fingerprint readers as produced by UPEK, Inc., of Emeryville, Calif. (reference may be made to www.touchchip.com).

With continued reference to both FIGS. 1 and 2, as currently evolving in the context of AMT, architecture has been developed that includes an arrangement whereby BIOS 86 can read (e.g., via a reader arrangement 86b) a configuration record off of an external medium (for example, a USB key as inserted at a USB port 204) and thence configure the AMT 206 via this record. (This general arrangement is disclosed, by way of background information, at http://communities.intel.com/docs/DOC-1247#USB2.) Intel currently provides such architecture in the context of iAMT. Essentially, then, rather than burdening a user with the need to manually enter AMT configuration data (e.g., via a keyboard), a USB key or other external medium can readily contain such information and thence be introduced to system 12, e.g., during a boot (while a USB key is inserted in USB port 204). Such information is thence accepted by the AMT 206 and typically includes a set of parameters that enables AMT 206 to securely communicate with a server over network 210.

It is also broadly contemplated herein that concepts relating to a "centralized managed password" (CMP) be employed. As is known conventionally, in the context of a CMP a user may typically type in a universal password for his/her use that has the ultimate effect of releasing, from a centralized location, any password or key that would be appropriate for allowing a user to access a specific system or system portion. In other words, rather than employ a multitude of passwords or keys to access a system or different system portions, a CMP can afford the use of what may be thought of as a "universal" password for a user, whereby this "universal" password serves to "release" whatever password(s), key(s) or other decryption element(s) may be needed to unlock, decrypt or permit access to the particular system or system portion to which a user is attempting to gain access. Since the "centralized location" may be a server, with the local location (where a user is logging in) being a client of the server, it can thus be appreciated that a CMP permits a server to control access to a client of the server, such that it would be easy (if needed) to revoke access to the client. Some helpful background information on CMP login may be found in the publication, "A Method of Secure Managed Secure Client PC," at the IP.com Prior Art Database (www.ip.com), IP.com number IPCOM000138248D; this publication is hereby fully incorporated by reference as if set forth in its entirety herein.

Preferably, in accordance with at least one preferred embodiment of the present invention, a computer system may employ a ME together with CMP concepts to provide an integrated system that enjoys the advantages of both elements. As will be better appreciated from the discussion herebelow, with CMP concepts in play a system will already be associated with a given user, while a HDP (hard disk password) and POP (power-on password) will be known to the server. IAMT, for its part, provides a secure connection between the ME engine and the server, and furthermore, it is likely that the ME engine is going to be the place where the fingerprint matching takes place, so the template will need to be stored in this location.

For the purposes of discussion herein, it may be assumed that a server or other centralized location will have knowledge of pre-boot passwords of a machine (e.g., client of a server), as well as a fingerprint template comprising "fingerprint minutiae" of any individual that will be permitted to authenticate the system. Essentially, the fingerprint minutiae may be considered to be physical data points in a fingerprint template, itself often of a size of about 300 bytes, that taken together are sufficient for distinguishing one user's fingerprint from another's. A distribution of fingerprint data points sufficient for such a purpose will generally be well known to those of ordinary skill in the art.

With continued reference to FIGS. 1 and 2 as well, FIG. 3 provides a flowchart of a process that may be carried out in accordance with a preferred embodiment of the present invention. Preferably, a secure connection is first made (320) between the ME 202 of a client and a server (e.g., over network 210). Thence, the template of a correct user fingerprint is transmitted (321) from the server to the ME 202. As part of this step, a POP and HDP may also preferably be passed at the same time from the server to ME 202. At the ME 202, then, the POP and HDP are associated with and stored with (322) the fingerprint template at the fingerprint reader (208). Accordingly, at 324, when the correct user authenticates biometrically (e.g., via the fingerprint reader at 208), the BIOS 86 will preferably then gain access to both password values (of the POP and HDP) at 326 and thereupon enable user logon to continue (328). After logon, the POP and HDP data are preferably locked (330) while throughout this process the POP and HDP need not be displayed to, made known to or made use of by the user. Accordingly, inasmuch as the POP and HDP are stored at the server and released to system 12 (particularly, to BIOS 86) in response to fingerprint (or conceivably other biometric) authentication, a CMP process is indeed brought about since the user does not need to know the HDP or POP in order to logon. More particularly, the fingerprint authentication can be considered to be a user's "universal password" in the context of a CMP arrangement as discussed heretofore.

Accordingly, it will be appreciated that embodiments of the present invention make active use of three highly advantageous mechanisms: a management engine 202 (permitting a server to initiate remote provision of a fingerprint template to a system, by acting as an "inlet" or "transport mechanism" for such remote provision into the system), a fingerprint authentication arrangement (e.g., at 208) and a CMP arrangement (via server provision of system passwords responsive to a "universal" user authentication in the form of biometric authentication). It will also be appreciated that this arrangement readily permits pre-boot authentication at a system without a user needing to provide standard passwords (e.g., a POP and/or HDP); the ME 202, by its very nature, permits the importation of an element such as a fingerprint template at times when the system is powered down.

By way of further advantageous refinements, it can now be appreciated that once "back end" management (e.g., a server) is able to communicate securely with an ME, then a number of other things also become possible. For instance, the provisioning or deprovisioning of users to a system could be carried out by simply having the server send a message to the ME engine either to erase the fingerprint template, disassociate it with the POP and HDP stored in the ME private space, or remove the POP and HDP stored by the ME. Accordingly, not only does the remote provisioning of fingerprint templates become possible (as discussed heretofore in connection with using an ME "transport" mechanism, and then allowing anyone who matches that template to be able to use the system), an ME mechanism could also be used to turn on a TPM (e.g., at 205) and provision it with keys that could be used to log on to the corporation (e.g. a VPN or wireless access point using 802.11i signature based authentication) when the template is matched.

By way of brief recapitulation, it will be appreciated that, in accordance with at least one presently preferred embodiment of the present invention, pre-boot passwords such as POP and HDP passwords may be generated and saved remotely, such as at a server. Thence, these pre-boot passwords may essentially be jointly sent with a user's fingerprint template over a secure connection to a system's ME, whereupon the template is accommodated by a fingerprint reader associated with the ME. At this point, the fingerprint reader will be ready to authenticate a user corresponding to the fingerprint template, whereupon the POP and HDP passwords can be "released", sight unseen to the user, to continue a logon process.

Although specific mention has been made hereinabove of fingerprint reading and recognition by way of providing biometric authentication, it should be understood that a very wide range of other biometric identification arrangements may be employed in accordance with embodiments of the present invention. Such possibilities include, but by no means are limited to: facial recognition, iris recognition, heartbeat recognition, and retina recognition, among a very wide range of other possibilities. Accordingly, such alternative arrangements could involve the use of a biometric template other than a fingerprint template such as, e.g., a facial pattern template, an iris template, a heartbeat pattern template and a retina template. Such alternative arrangements can also involve the use of biometric user input other than a user's fingerprint in connection with a fingerprint reader such as, e.g., a user's facial pattern at a facial pattern reader, a user's iris at an iris reader, a user's heartbeat at a heartbeat pattern reader or a user's retina at a retina reader.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   prior to a first biometric login of a user at a computing device, receiving and storing one or more biometric templates of the user and one or more unlocking elements associated with the one or more biometric templates from one or more servers at a management engine of the computing device;
   thereafter, at user logon at the computing device, authenticating, at a biometric device of the computing device, biometric user input using a user biometric template of the one or more biometric templates received and stored prior to a first biometric login of the user;
   identifying, at the management engine of the computing device, one or more unlocking elements associated with the user biometric template selected from the one or more unlocking elements received and stored prior to a first biometric login of the user; and
   thereupon continuing computing device logon via employing the one or more unlocking elements which are distinct from the user biometric template.

2. The method according to claim 1, wherein the user biometric template comprises a fingerprint template.

3. The method according to claim 2, wherein the biometric user input comprises user fingerprint input.

4. The method according to claim 1, wherein the one or more unlocking elements comprise a system password.

5. The method according to claim 4, wherein the system password comprises a power-on password.

6. The method according to claim 4, wherein the system password comprises a hard disk password.

7. The method according to claim 1, wherein said employing comprises using a BIOS to employ the unlocking element.

8. The method according to claim 1, wherein the management engine is configured to receive one or more biometric templates and one or more unlocking elements while the computing device is powered down.

9. The method according to claim 1, wherein authenticating biometric user input comprises pre-boot authentication.

10. The method according to claim 1, wherein the one or more unlocking elements and the one or more biometric templates are managed through a centralized managed password arrangement.

11. The method according to claim 10, wherein the biometric user template operates as a universal password within the centralized managed password arrangement.

12. The method according to claim 1, further comprising receiving one or more system user messages from the one or more servers at the management engine, the one or more system user messages being configured to provision or deprovision a system user at the computing device.

13. The method according to claim 12, further comprising:
   wherein to provision a system user comprises associating a user biometric template associated with the system user with the one or more unlocking elements;
   wherein to deprovision a system user comprises deleting a user biometric template associated with the system user.

14. The method according to claim 1, wherein the one or more unlocking elements comprise an unlocking element configured to log on to a corporate network.

15. A program storage device readable by machine, tangibly embodying a program of instructions executable by the machine to perform acts comprising:
   prior to a first biometric login of a user at a computing device, receiving and storing one or more biometric templates of the user and one or more unlocking elements associated with the one or more biometric templates from one or more servers at a management engine of the computing device;
   thereafter, at user logon at the computing device, authenticating biometric user input using a user biometric template of the one or more biometric templates received and stored prior to a first biometric login of the user;
   identifying, at the management engine of the computing device, one or more unlocking elements associated with the user biometric template selected from the one or more unlocking elements received and stored prior to a first biometric login of the user; and
   thereupon continuing computing device logon via employing the one or more unlocking elements which are distinct from the user biometric template.

16. An apparatus comprising:
   a computing device;
   a main memory associated with said computing device;
   a management engine arranged within the computing device, in communication with said main memory, which receives and stores, prior to a first biometric login of a user at the computing device, one or more biometric templates of the user and one or more unlocking elements associated with the one or more biometric templates from one or more servers;

an authenticator which thereafter authenticates at user logon at the computing device biometric user input using a user biometric template of the one or more biometric templates received and stored prior to a first biometric login of the user;

an identifier at the management engine of the computing device which identifies one or more unlocking elements associated with the user biometric template selected from the one or more unlocking elements received and stored prior to a first biometric login of the user; and an unlocker which continues computing device logon via employing the one or more unlocking elements which are distinct from the user biometric template.

17. The apparatus according to claim 16, wherein:

the user biometric template comprises a fingerprint template; and the biometric user input comprises user fingerprint input.

18. The apparatus according to claim 16, wherein said management engine acts to store the one or more biometric templates and the one or more unlocking elements prior to computing device logon.

19. The apparatus according to claim 16, wherein the one or more unlocking elements comprise a system password.

20. The apparatus according to claim 16, wherein said unlocker comprises a BIOS.

\* \* \* \* \*